United States Patent [19]
Sklansky et al.

[11] Patent Number: 6,008,851
[45] Date of Patent: Dec. 28, 1999

[54] METHOD AND APPARATUS FOR VIDEO DATA COMPRESSION

[75] Inventors: Jack Sklansky, Corona Del Mar; Eugene Vendrovsky, Lake Forest, both of Calif.

[73] Assignee: The Regents of the University of California, Oakland, Calif.

[21] Appl. No.: 08/655,350

[22] Filed: May 23, 1996

[51] Int. Cl.$^6$ ........................................... H04N 7/12
[52] U.S. Cl. ............................. 348/416; 348/699
[58] Field of Search ........................ 348/416, 420, 348/421, 699, 700

[56] References Cited

U.S. PATENT DOCUMENTS

| | | | |
|---|---|---|---|
| 5,173,772 | 12/1992 | Choi | 348/416 |
| 5,247,586 | 9/1993 | Gobert et al. | 348/420 |
| 5,267,332 | 11/1993 | Normille et al. | 348/416 |
| 5,394,196 | 2/1995 | Robert | 348/699 |
| 5,486,863 | 1/1996 | Anyeung et al. | 348/421 |
| 5,561,475 | 10/1996 | Jung | 348/699 |
| 5,619,268 | 4/1997 | Kobayashi et al. | 348/416 |
| 5,627,591 | 5/1997 | Lee | 348/416 |
| 5,646,691 | 7/1997 | Yokoyama | 348/416 |

*Primary Examiner*—Jeffrey R. Jastrzab
*Assistant Examiner*—Luanne P. Din
*Attorney, Agent, or Firm*—Daniel L. Dawes

[57] ABSTRACT

Data compression of a sequence of digital frames is achieved by periodic sampling of the frames to form a sequence of "milestone frames". Each frame between the milestone frames is partitioned into a set of subarrays or fragments that cover the frame. Each fragment is projected one frame forward or backward, depending on the direction of tracking, and then displaced to a position yielding the closest match in the adjacent frame. The data available for transmission or storage is comprised of: a) compressed encoding of the milestone frames; and b) the displacements of the fragments from either adjacent frame. Unique to this invention is the construction of a motion trajectory at each pixel of each frame and the reconstruction of the intensity values of the pixels in those frames that are not milestone frames. The construction of motion trajectories is achieved by finding sequences of connected displacements of fragments. The reconstruction of the intensity values is achieved by interpolation of the pixel values along motion trajectories between pairs of successive milestone frames. Some pixels in nonmilestone frames may not lie on a computed trajectory. These pixels are reconstructed by iterative spatial interpolation of previously reconstructed neighboring pixels. Trade-offs among the delay of reconstruction and the spatial image quality can be achieved by varying the time between successive milestone frames, the number of frames per second, the size of each fragment, and the size of each frame.

3 Claims, 4 Drawing Sheets

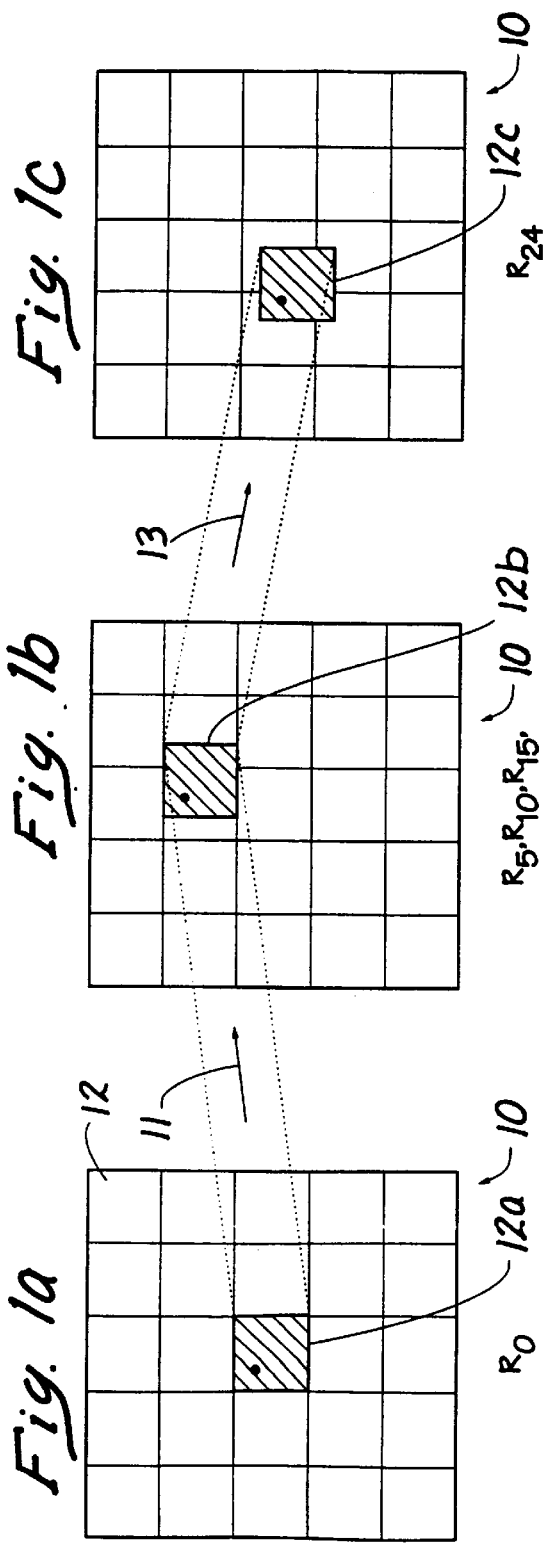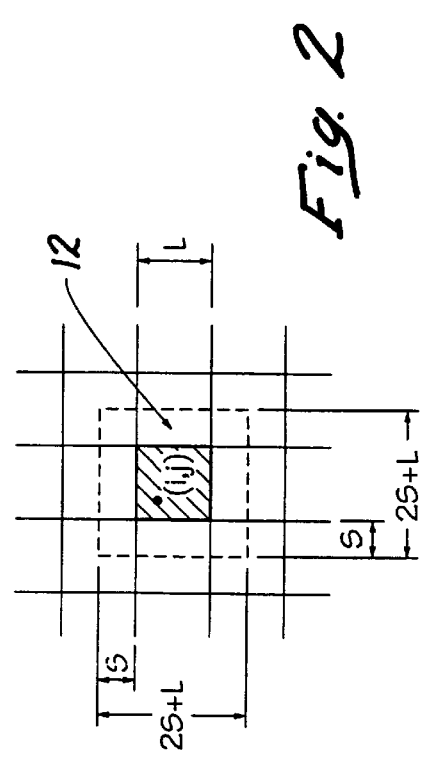

METHOD AND APPARATUS FOR VIDEO DATA COMPRESSION

BACKGROUND OF THE INVENTION

1. Field of the Invention

The invention relates to the field of video communication, and in particular to the time compression of digital frames of time varying images.

2. Description of the Prior Art

The prior apparatus and methodology used for the transmission of video or time varying images was typically based on a scheme in which information of pixel intensity values in each frame was transmitted. In some prior art approaches, only temporal or spatial changes in the information are transmitted, namely the boundaries or movement of patterns. While the transmission of information changes from frame to frame results in some data compression, the amount of compression is nevertheless limited by the restriction that the data changes are transmitted on a pixel-by-pixel basis. For a lossless data transmission, pixel-by-pixel information may be necessary, but in applications where loss of some data may be acceptable, such as in televideo conferencing as opposed to transmission of broadcast quality images, transmission of information on an other than pixel basis may be acceptable.

Therefore, what is needed is a method and apparatus wherein time varying image data compression can be maximized or optimized without tracking each pixel in the image.

BRIEF SUMMARY OF THE INVENTION

The invention is a method for compressing data for storage or transmission of a sequence of frames of pixel images. The method comprises the steps of defining an initial milestone frame, $R_0$, and a final milestone frame, $R_P$, of the sequence of frames. The defined milestone frames, $R_0$ and $R_P$ are data compressed, such with a JPEG or H.261 compression methodology. Each of the frames of the sequence are partitioned into a plurality or set of fragments or subarrays. The movement of each fragment of each frame is tracked to the next or previous frame in the sequence of frames to define a motion vector for each fragment in each frame. As a result, data compression of the sequence of frames is achieved by reducing pixel data from the sequence of frames into data-compressed milestone frames and a motion vector of each fragment in each frame pointing to a displaced fragment in the next frame.

In the illustrated embodiment the frames are partitioned into square fragments, but any partitioning protocol can be used. The step of tracking of the motion of each fragment in each frame to the next frame is carried out by searching a predefined search area in the next frame for an optimal match with the fragment of the preceding frame. The step of searching the predefined area for an optimal match may be carried out by computing an absolute error between the fragment in the preceding frame and an equal size fragment in the predefined search area.

The method further comprises the step of reconstructing the sequence of compressed frames from the milestone frames and motion vectors of fragments between adjacent frames by interpolating pixel values for each pixel in frames between the milestone frames based upon prototype pixels in the milestone frames. The prototype pixels are the pixels at the ends of the motion trajectories that join pixels in each milestone frame to another pixel in the next milestone frame.

If a pixel has associated prototype pixels in both the initial milestone frame. $R_0$, and the final milestone frame, $R_P$, then the pixel value is interpolated according to:

$$Rj\ (k,\ l) = [(P-j)/mP]\ \Sigma p_0^{(m)} + (j/p)\ p_P$$

summed from i=1 to m, where P is the number of frames from and including the first milestone frame to the next milestone frame, and $p_P$ is the pixel value in the $R_P$ milestone frame.

If the interpolated pixel has no prototype pixels in the initial milestone frame, $R_0$, so that the interpolated pixel value is determined by:

$$Rj\ (k,\ l) = (P-j)p_A/P + j\ p_P/P$$

where a final pixel value $p_P$ is taken from the milestone frame, $R_P$, and where $P_A$ is an average pixel value in a predetermined region surrounding the interpolated pixel value.

Where no interpolated pixels in the predefined region exist, the method further comprises iteratively interpolating pixel values within the predefined region from already interpolated pixel values outside the predefined region until each pixel in the predefined region has an interpolated pixel value.

In another embodiment of the invention, the initial milestone frame, $R_0$, and the final milestone frame, $R_P$, are defined as Type I milestone frames and some of the other frames of the sequence of frames between the initial and final milestone frames, $R_0$ and $R_P$, are defined as Type II milestone frames. The remaining frames of the sequence of frames are defined as Type III frames. The pixel values in every Type III milestone frame are interpolated along the motion trajectories joining the two closest Type I or Type II milestone frames.

The Type II milestone frames are coded to a predicted frame using previous frames and then quantized to a residual formed by subtracting the predicted frames from the original frame for each Type II frame.

In one embodiment the Type II milestone frame is predicted using prototypes found in a previous Type I or Type II milestone frame using fragment motion trajectories to the previous milestone frame. The predicted frame is based on an average of identified prototypes.

In the case where at least one pixel within the Type II frame has no prototypes in a previous milestone frame, the method further comprises the step of assigning a pixel value to the at least one pixel using interpolated iterative expansion in a predefined region of the Type II frame.

The step of data compressing the defined milestone frames, $R_0$ and $R_P$, may comprise the step of JPEG or H.261 compressing the defined Type I milestone frames, $R_0$ and $R_P$. The method may further comprise data compressing the motion vectors corresponding to the fragments in each frame.

The invention has been characterized above as a method, but it is equally valid to defined that invention as an apparatus for performing the claimed method. The apparatus may comprise various elements for performing each of the steps. The elements themselves may comprise custom logic circuits specifically designed to perform the defined function in hardware or firmware, or may be portions of a software controlled general purpose or dedicated computer for performing each of the steps.

For example, the invention is also defined as an apparatus for compressing data for storage or transmission of a sequence of frames of pixel images comprising an element for defining an initial milestone frame, $R_0$, and a final milestone frame, $R_P$, of the sequence of frames; an element for data compressing the defined milestone frames, $R_0$, and $R_P$; an element for partitioning each of the frames of the sequence into a set of fragments; and an element for tracking movement of each fragment of each frame to the next or preceding frame in the sequence of frames to define a motion vector for each fragment in each frame. As a result, data compression of the sequence of frames is achieved by reducing pixel data from the sequence of frames into data compressed milestone frames and motion vectors of each fragment of each frame to the next or preceding frame in the sequence.

The invention may be visualized by turning to the following drawings wherein like elements are referenced by like numerals.

BRIEF DESCRIPTION OF THE DRAWINGS

FIGS. 1a–1c is a diagram illustrating the motion vector of a fragment between successive frames of a sequence of frames.

FIG. 2 is a diagram illustrating the search area for seeking a fragment match.

Figure 3:
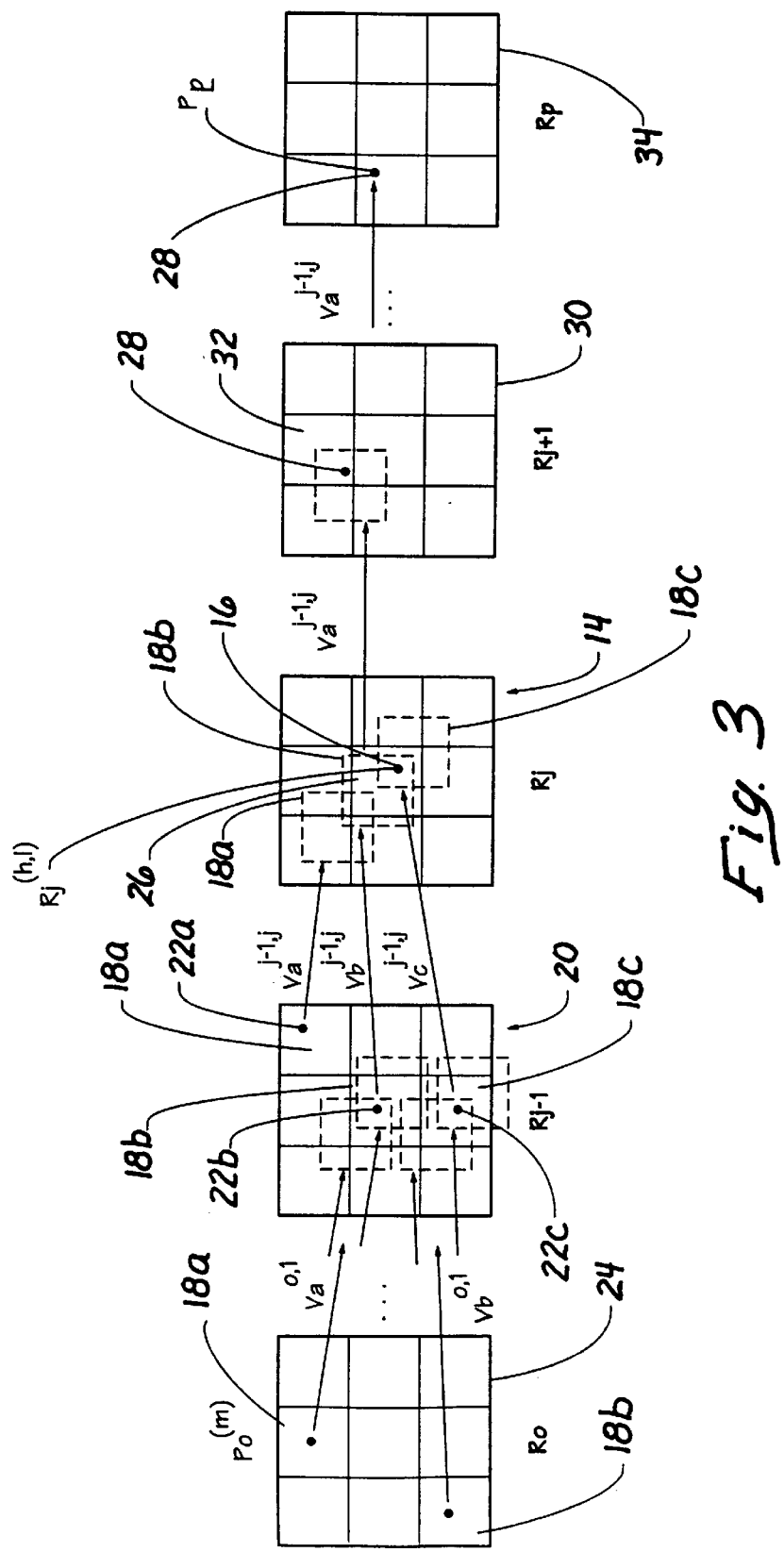
FIG. 3 is a diagram illustrating the reconstruction of a pixel using traced paths to an initial milestone frame if possible, and to a final milestone frame.

The illustrated embodiments in the invention briefly described above and its various embodiments may now be understood by turning to the following detailed description.

DETAILED DESCRIPTION OF THE PREFERRED EMBODIMENTS

Data compression of a sequence of digital frames is achieved by periodic sampling of the frames to form a second sequence, called "milestone frames". Each frame of the first sequence is partitioned into a set of subarrays or fragments that fully cover the frame. Each fragment is projected one frame forward or one frame backward, depending on the direction of tracking, and then displaced to a position yielding the closest match of the pattern of pixels in the displaced fragment to the pattern of pixels in the region of the adjacent frame onto which the fragment is projected. The compressed data available for transmission or storage is comprised of: a) compressed encoding of the milestone frames; and b) the displacements of the fragments projected onto each frame from either the previous or the next frame. Unique to this invention is the construction of a motion trajectory at each pixel of each frame and the reconstruction of the intensity values of the pixels in those frames that are not milestone frames. The construction of a motion trajectories is achieved by finding sequences of connected displacements of fragments. The reconstruction of the intensity values is achieved by interpolation of the pixel values along motion trajectories between pairs of successive milestone frames. Some pixels in nonmilestone frames may not lie on a computed trajectory. These pixels are reconstructed by iterative spatial interpolation of previously reconstructed neighboring pixels. Trade-offs among the delay of reconstruction and the spatial image quality can be achieved by varying the time between successive milestone frames, the number of frames per second, the size of each fragment, and the size of each frame.

When combined with conventional high speed compression of still images, the methodology of this invention achieves compression ratios in sequences of 256×256×8-bit digital frames of over 200. The methodology makes it possible to provide subjectively good quality video communication of a wide range of time varying images over 64,000-bit telephone lines which can be used to realize significant dose reductions when used in medical cinafluoroscopy and substantial reductions in space required for storing cinematic or video imagery.

Consider now how the methodology operates in the abstract. Let R represent a sequence of frames $<R_i: I=0, \ldots, n>$. Let P represent a subset of the sequence of frames R $<R_{24k}: k=0, \ldots, m>$ where n=24 m. In other words, P is a subset of the sequence R comprising every 24th frame. The elements of P are defined as the milestone frames. The selection of the coefficient 24 as the definition of the milestone frame subset is used only as an illustration and any other value may be employed consistent with the teachings of the present invention.

Each milestone frame which is a member of subset P, is compressed for storage or transmission by any compression hardware or software now known or later devised. For example, in the illustrated embodiment, each of the milestone frames are compressed according to a JPEG format.

Each milestone frame, MF, is then partitioned into an 8×8 array 10 of square fragments 12, namely the frame is partitioned into 64 fragments as illustrated diagrammatically in FIG. 1a. For the purposes of simplicity of illustration, array 10 is assumed to be square, but may in fact be of any geometric configuration and may be partitioned into any other number of fragments, square, rectangular or otherwise, consistent with the teachings of the present invention. Assume again for the sake of clarity that array 10 is a pixel image measuring 250-pixels-by-250-pixels. Thus, each fragment represents a 32-pixel-by-32-pixel square. The graphic or pixel data in each of the 20 milestone frames, and in each of the 64 fragments, is thus identified for storage and/or transmission. Thereafter, the displacement from frame-to-frame, which may be termed the frame velocity of each fragments, is then determined. The frame velocity is the only data transmitted or saved for reconstruction of the frames between adjacent milestone frames.

For example, in the depiction of FIG. 1a the pattern in fragment 12a in milestone $R_0$ is determined to move according to a vector displacement 11 to the position of fragment 12b in frame $R_1$ in FIG. 1b. The image data of the fragment is updated from frame to frame and used for fragment detection in the next sequential frame. Thereafter, the pattern of the last updated fragment moves by a vector displacement 13 from frame $R_1$ to fragment 12c of the frame $R_2$ in FIG. 1c.

Let Ri (k. l) refer to the (k, l) pixel in the i-th frame, where the pixels are indexed in a square matrix array. Let L be the side dimension of each of fragments 12 used for motion tracking and interpolation as described below. Finally, let s define the search area for motion tracking, which is a square region (2s+1) by (2s+1) in size. Consider now what happens to one block of video data and the first frame of the next block, i.e. $R_0, R_1 \ldots R_{20}$ as a first block of frames in the illustrated embodiment.

$R_0$ and $R_{24}$ are coded independently of other frames through the use of JPEG or other compression operating at a data compression of approximately 0.25 bits per pixel. Therefore, in the case of a 352×288 and 256×256 pixel image, this corresponds to 25,344 and 16,384 bits, respectively, for each of these milestone frames, $R_0$ and $R_{24}$. Assume that the object is to transmit a 256×256 format video sequence in a 64 kilobit-per-second channel. This leaves 40,616 bits for motion vectors and voice. Voice, in most instances, can be adequately handled with a bandwidth of 8-kilobits-per-second with the latest technology. More bits will be needed for color image transmission. Assume in the illustrated embodiment, that P=24 which corresponds to the cinemagraphic standard of 24 frames per second. In other words, a milestone frame would be sent once each second.

Note that $R_0$ and $R_{24}$ must be received before $R_1 \ldots R_{23}$ can be decoded. As indicated, this may be a one second delay, which could be regarded as significant in teleconferencing. The delay can be reduced by reducing P below 24 at the penalty of using more bits for extra JPEG frames. Alternatively, frames may be skipped or frame size reduced or both according to design option.

In the first step, the original milestone frame, $R_0$, is decomposed into N–L×L fragments based on a square grid in which the upper left-hand coordinates of the fragments are at pixel locations (iL, jL), where i and j integers. Each identified fragment in $R_0$ is then used as a template in the next frame, $R_1$, which is searched to find the position of that L×L block that best matches it in terms of absolute error. Any search and matching algorithm or criterion now known or later devised may be employed consistent with the teachings of the invention. In the preferred embodiment, it is assumed that the upper left-hand coordinates of each fragment are the pixel locations (i, j). Matches are computed between this fragment and all L×L blocks in frame $R_1$ whose upper left-hand corners are between (i–s, j–s) and (i+s, j+s), or in other words, a search will be made of all L×L blocks of the fragments within plus or minus s of the (i, j) location point of the template fragment as diagrammatically depicted in FIG. 2. In the illustrated embodiment, L=16 and s=7, which results in a 15×15 search area.

These steps are then replicated for each frame in the data block up to $R_{24}$ from which the motion trajectories will be computed from the original frames. In other words, frame $R_1$ is then taken and partitioned into L×L fragments whose upper left-hand coordinates are (iL, jL). Then in the next sequential search, $R_2$ is searched for matches. When a best or acceptable match is found, the displacement of the fragment is denoted and this is the motion velocity which is sent as the compressed data.

The pixel value in the frames between the two milestone frames of the data block, $R_0$ and $R_{24}$, that is the intensity of the pixel or whatever other pixel code or format may be used to characterize each pixel, is interpolated for the frames between the two milestone frames according to two strategies depending on whether or not the given pixel can be traced back to a pixel in the initial milestone frame, $R_0$, using an unbroken sequence of the moving fragments. In either strategy, the objective is to find the "prototype" of the pixel in the initial frame $R_0$ if possible and in the final frame, $R_{24}$.

Consider for example the interpolation of the pixel value for the pixel, $R_j(k, l)$. Consider first a "type A" pixel. If any fragment of the prior frame, $R_{j-1}$, overlaps or contains the pixel in question, $R_j$ (k, l), then an attempt is made to find a prototype pixel in both the starting milestone frame, $R_0$, for the data block and the ending milestone frame, $R_{24}$, for the data block. This is done as follows. For the prototypes in the frame $R_0$, $(P_0^{(1)}, \ldots P_0^{(m)})$ all the fragments in the preceding frame, $R_{j-1}$, the pass through the pixel, $R_j$ (k, l), are examined and the pixel in each of these fragments that corresponds to $R_j(k, l)$ is found. Each of the these pixel locations in the preceding frame, $R_{j-1}$, are then taken and in turn their prototypes in the preexisting frame, $R_{j-2}$, are identified, if they exist. If the prototypes to the $R_{j-1}$ frame pixels do not exist in the preceding frame $R_{j-2}$, then the prototype path is dropped. However, if some prototype pixels do exist, the procedure is repeated with the next preceding frame, $R_{j-3}$, and so on until the first milestone frame, $R_0$, is reached. If at any time, all the pixel paths disappear into dead ends, the pixel is then labeled a "Type B" pixel and is interpolated according to the strategy below. Again, what is used as a pixel value may refer to pixel intensity or any other pixel characterization or encoding according to color formats now or later devised.

If it is determined that it is a Type B pixel, namely that there are no continuous paths or trajectories of prototypes leading to the first milestone frame, $R_0$, then the pixel, Rj (k, l) is tracked to the next succeeding frame, $R_{j+1}$. Assume for the sake of illustration, that the $R_j$ (k, l) pixel in frame $R_j$ moves to the pixel in the next frame, $R_{j+1}$ (n, m). The motion information in the fragment described above is then used to track the fragment in the $R_{j+1}$ frame that contains the pixel location, (n, m), to the next succeeding frame, $R_{j+2}$. This process is repeated until you get to the final milestone frame in the block, $R_{24}$, at which point an identified prototype pixel is determined.

Once the prototype and milestone frames have been identified, then the JPEG coded information for those pixels are used in Equation 1 below to interpolate the pixel value of the $R_j$ (k, l) pixel.

$$Rj\ (k,l) = [(P-j)/mP]\ \Sigma p_0^{(m)} + (j/p)\ p_P \qquad (1)$$

summed from i=1 to m, where P is the length of the data block, which was 24 in the illustrated example, and $p_P$ is the pixel value in the $R_P$ milestone frame.

In the second strategy, if the pixel $R_j$ (k, l) has no prototypes in the initial milestone frame, $R_0$, which includes a case where no fragment of the preceding frame $R_{j-1}$ overlaps pixel $R_j$ (k. l), the interpolation is performed as follows. The prototype pixel in the final milestone frame, $R_{24}$, is identified as described above. Then an "averaging prototype" $P_A$ is obtained by averaging the already interpolated pixels in a 3×3 pixel region surrounding the pixel, $R_j$ (k, l). The interpolated pixel is then obtained by Equation 2 below.

$$Rj\ (k,\ l) = (P-j)/p_A/P + j\ p_P/P \qquad (2)$$

where again, the final pixel value $p_P$ is taken from the final JPEG coded milestone frame, $R_P$ or $R_{24}$ in our illustration.

There may be cases in which there is no already interpolated pixels even in the 3×3 region surrounding $R_j$ (k, l). In this case, no interpolation of the pixel is made but a subsequent interpolating iteration on the $R_j$ is made once the remaining Type B pixels have been processed. Eventually, all pixels in the frame, $R_j$, will be interpolated since the blank region around the given pixel will shrink on each interpolation.

The graphic illustration of FIG. 3 will make the tracking process clearer and how the pixel data is reconstructed from the compressed end milestone frames in a data block. In frame $R_j$. denoted by reference numeral 14, assume the pixel of interest, $R_j(k, l)$, denoted by reference numeral 16, assumes a pixel position (k, l) which is overlapped by three fragments 18a, 18b and 18c of the preceding frame, $R_{j-1}$, denoted by reference numeral 20. Each of these fragments 18a, 18b and 18c in frame 20, $R_{j-1}$, are then scanned to determine which pixel 22a, 22b and 22c in corresponding fragments 18a, 18b and 18c matches pixel 16 in frame 14, $R_j$. Again, from the known fragment vectors for each of the fragments 18a, 18b and 18c in frame 20, the process is again repeated to the preceding frame as long as there is a continuous vector trajectory to the next frame. In the illustration of FIG. 3, we assume that that two of the three fragments, 18a, 18b and 18c, can be traced in a continuous chain of fragment vectors to the initial frame $R_0$, denoted by reference numeral 24.

Similarly, from frame 14, $R_j$, the vector trajectory of fragment 26 in frame 14 is known and pixel 28 in fragment 26 occurring in the next frame 30, $R_{j+1}$, is identified. In the same way, from each vector motion of the fragments in which pixel 28 is carried, for example, fragment 32 in frame 30 the path to the final frame 34, $R_P$, is traced. Therefore, the JPEG compression value of pixel 28 in frame 34 is used as the end point milestone pixel from which Equation (1) or (2) as appropriate is used to interpolate the pixel value of pixel 16 in frame 14 depending upon whether a pixel in the initial frame 24 can be found. FIG. 3, thus, represents the reconstruction method for reconstructing the pixel value of any given pixel in a data block using milestone pixel compression data together with fragment vector data for each of the frames between the end milestone frames.

Figure 4:
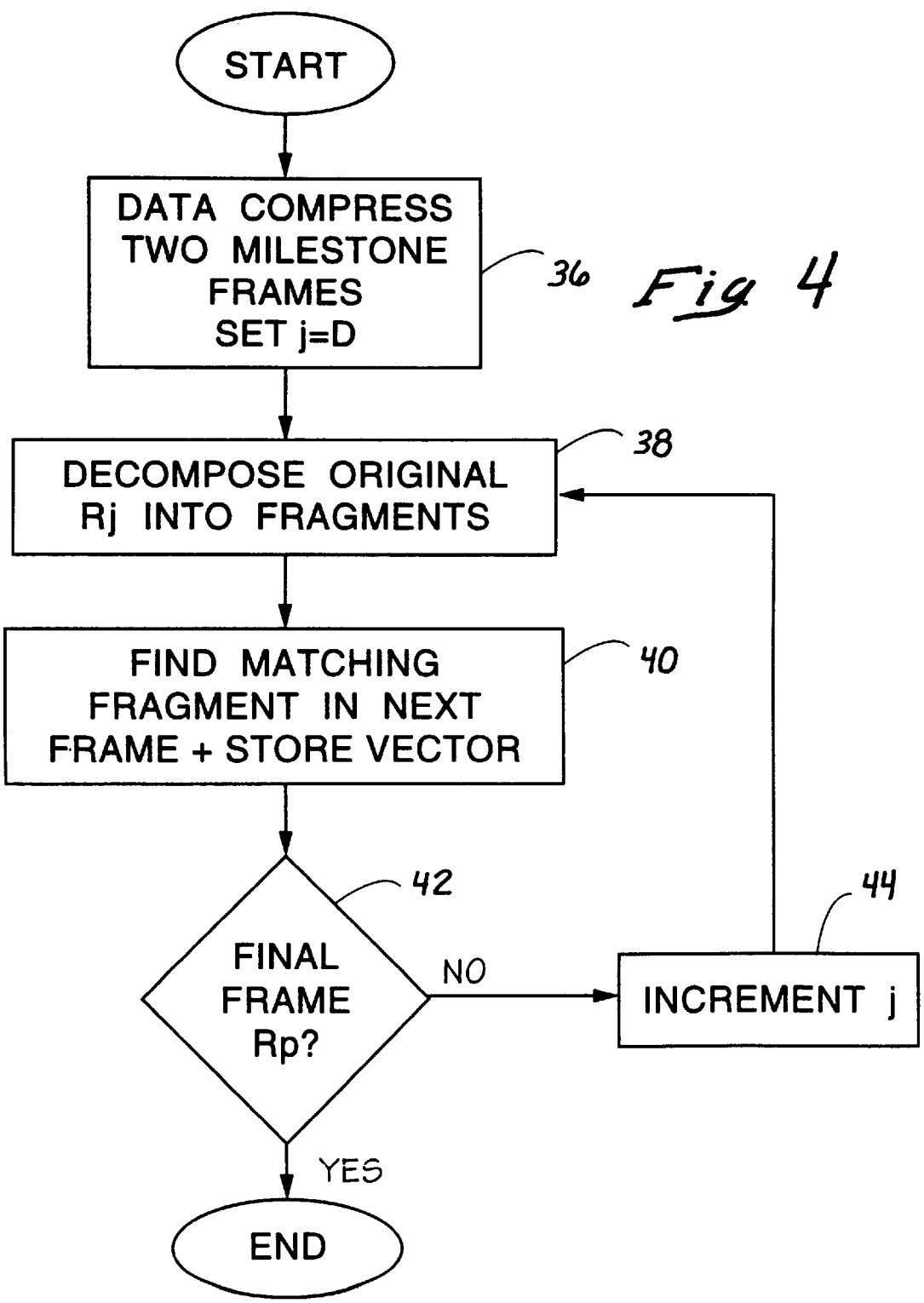
FIG. 4 is a simplified flow diagram illustrating the data compression method of the invention.
Figure 5:
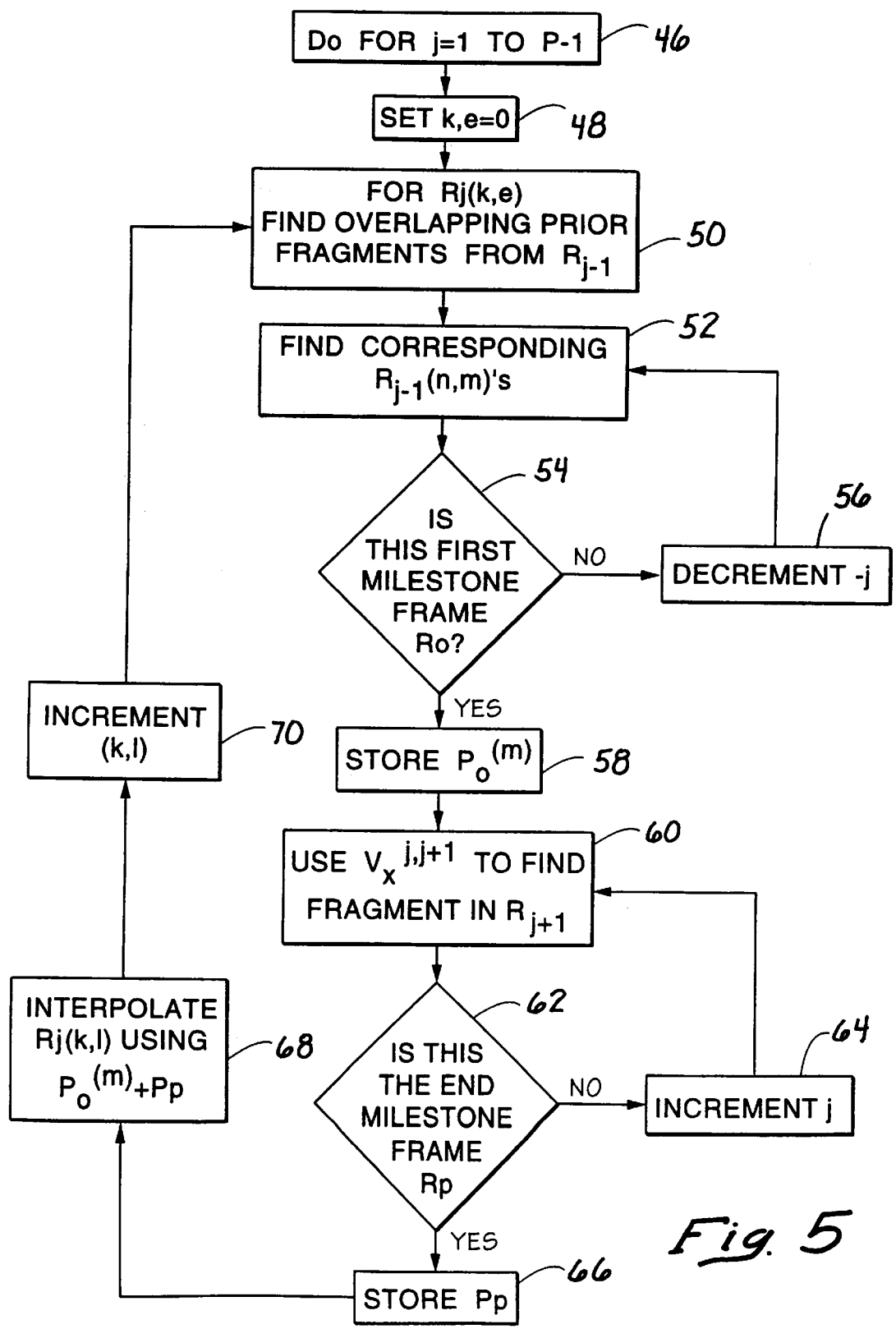
FIG. 5 is a simplified flow diagram illustrating the data reconstruction method of the invention.

The methodology is further illustrated in flow diagrams FIGS. 4 and 5. In FIG. 4, the method starts at step 36 in which the two milestone frames $R_0$, $R_P$, frames 24 and 34 of FIG. 3, are compressed using any type of compression desired. Starting with the milestone frame $R_0$, it is decomposed or partitioned at step 38 into fragments. The position to which each fragment has moved in the next frame is determined at step 40 which defines a motion vector for each fragment, which vector is stored. If the end point of the motion vector is not a final frame as determined at step 42, then the frame index, j, is incremented at step 44 and the process continued until motion vectors for each of the fragments. starting from the initial milestone frame and terminating with the final milestone frame, $R_P$, frame 34, is determined. This compressed data is then available for transmission or storage in any protocol desired.

The reconstruction methodology is illustrated in FIG. 5, which is repeated for each of the intermediate frames 20, 14 and 30, $R_1 \ldots R_{P-1}$, between end milestone frames as depicted at step 46. The pixel position is initialized to an origin at step 48 after which the pixel at that point is examined in the frame in question, $R_j$, frame 14, to determine what fragments from the prior frame 20, $R_{j-1}$, include that pixel location as determined at step 50. The corresponding pixels are thus determined in step 52 for the prior frame 20, $R_{j-1}$. If this is not the initial milestone frame, $R_0$, as determined at step 54, the frame index, j, is decremented at step 56, and the process continued until the initial milestone frame is reached. The pixel locations are then finally identified in $R_0$ and the JPEG value for those pixel locations are stored at step 58.

Similarly, pixels traced forward define the final milestone prototype by using the fragment vector between frame 14, $R_j$, and the next frame 30, $R_{j+1}$, namely the vector $V_x^{j,j+1}$ as determined at step 30. If the next frame is not the final milestone frame 34, $R_P$, as determined at step 62, this vector extrapolation is continued by incrementing the index frame j at step 64 until the final milestone 30, $R_P$, is reached, at which point, the JPEG value for the identified pixel location in the final frame is determined and stored at step 66. Having now attained both the initial milestone frame pixel values, if any, and final milestone pixel value. the pixel value of the location in question is interpolated at step 68 using either Equations (1) or (2) as appropriate. Thereafter, the pixel location (k, l) is incremented at step 70 and the process returns to step 50 to establish an interpolated pixel value for the next pixel location in the frame. As stated by step 46, this process is continued for each of the intermediate frames until interpolated values for each pixel is established.

In another embodiment of the invention, two types of milestone frames are defined. Type I and Type II. Type I milestone frames are data compressed, as were the milestone frames in the embodiment described above and are separated by $P_A$ original frames. The Type II milestone frames occur sequentially between the Type I milestone frames and are coded by predicting their value using the previous frames, and then quantized in a residual form of subtraction of the predicted milestone frame from the original milestone frame. The Type II frames are spaced $P_B$ original frames apart such that $P_A$ is a multiple of $P_B$. For example, $P_A$ may be 24, wherein the Type I frames are separated by 24 original frames counting the Type II frames, whereas each of the Type II frames are separated from the next Type I or Type II frame by five original frames as depicted in Table I below.

TABLE I

| $A_1$ | $B_{1,1}$ | $B_{1,2}$ | $B_{1,3}$ | $A_2$ |
|---|---|---|---|---|
| $R_0$|$R_1R_2R_3R_4R_5$|$R_6$|$R_7R_8R_9R_{10}R_{11}$|$R_{12}$|$R_{13}R_{14}R_{15}R_{16}R_{17}$|$R_{18}$|$R_{19}R_{20}R_{21}R_{22}R_{23}$|$R_{24}$| | | | |

A third type of frame, Type III frame, is the interpolated frame between Type I or Type II milestone frames, such as $P_C$ original frames apart. If $P_C=2$ for example, then only every other frame is interpolated which corresponds to reduction in frame rate by factor of two. The Type III frames are encoded in the same way as the interpolated frames described above, that is they will be interpolated using the closest Type I or Type II milestone frames on either side for their interpolation. This means that the motion information describing the movement of fragments of a previous milestone frame to the next milestone frame must be transmitted as side information. The number of sets of motion vectors that must be sent is $P_B+P_C$. The motion vectors themselves may be coded using any type of compression scheme now known or later devised. In the illustrated embodiment, the motion vectors are coded by using the difference between the current motion vector and the previous one on a fragment-by-fragment basis. In this way, if the fragment does not move, there is no vector information that is transmitted.

There are two possible ways to encode the Type II frames. The first method is to encode the sequence of Type I and Type II frames using a conventional coding method, such as H.261, which is a standard block base motion compensation between milestone frames with the residual encoded using discrete cosine transforms (DCT) with the intraframe spacing set to $P_A$. The disadvantage of this approach is that extra motion information must be transmitted, since we are already tracking the motion fragments to interpolate the Type III frames.

The second method is to predict each Type II frame using prototypes found in previous milestone frames, wherein the prototypes are obtained using the same motion trajectories as required to interpolate the Type III frames. The interpolation method is thus similar to the way in which the Type III frames are interpolated except there are no prototypes in the next milestone frame. The prediction is based simply on the reconstruction (like Type III frames) using previous milestone frame data and motion vectors. However, there will likely be many pixels in the prediction that do not have prototypes in a previous milestone frame. In this case, the "gaps" are filled by iterative expansion using a 3×3 window as described above. This is done in the same manner as in the Type III interpolation with the exception that there is no contribution from any following milestone frame. Thus, this is a predictive method as opposed to an interpolated method between end points.

The Type I frames are encoded using a conventional algorithm, such as an H.261 algorithm, although the JPEG coding could be used as well.

Thus, the alternative embodiment contemplates using either predicted milestone frames between the two completely encoded end point milestone frames from which the remaining frames are interpolated, or encoding the intermediate Type II milestone frames by transmitting or storing only the difference or residual between the predicted and original data for that Type II frame.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings. but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structures, materials or acts for performing substantially the same function in substantially the same way to obtain substantially the same result.

Insubstantial changes from the claimed subject matter as viewed by a person with ordinary skill in the art. now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of compressing data for storage or transmission of a sequence of frames of pixel images comprising:

defining an initial milestone frame, $R_0$, and a final milestone frame, $R_P$, of said sequence of frames;

data compressing said defined milestone frames, $R_0$, and $R_P$;

partitioning each of said frames of said sequence into a plurality of fragments; and tracking movement of each fragment of each frame to the next adjacent frame in said sequence of frames to define a motion vector for each fragment in each frame, reconstructing said sequence of frames from said milestone frames and motion vectors of fragments between adjacent frames by interpolating pixel values for each pixel and frames between said milestone frames based upon prototype pixels in said milestone frame, wherein a pixel has m associated prototype pixels, $p_O^{(m)}$, in both said initial milestone frame, $R_0$, and said final milestone frame, $R_P$, so that said pixel value is interpolated according to:

$$Rj\ (k,l) = [(P-j)/mP]\ \Sigma p_O^{(m)} + (j/p)\ p_P$$

summed from i=1 to m, where P is the length of said sequence of frames between to milestone frames, $R_O$ and $R_P$, and $p_P$ is the pixel value in said $R_P$ milestone frame, whereby data compression of said sequence of frames is achieved by reducing pixel data from said sequence of frames into data compressed milestone frames and motion vectors of each fragment of each frame to the next adjacent frame in said sequence.

2. A method for compressing data for storage or transmission of a sequence of frames of pixel images comprising:

defining an initial milestone frame, $R_0$, and a final milestone frame, $R_P$, of said sequence of frames;

data compressing said defined milestone frames, $R_0$, and $R_P$;

partitioning each of said frames of said sequence into a plurality of fragments; and tracking movement of each fragment of each frame to the next adjacent frame in said sequence of frames to define a motion vector for each fragment in each frame, reconstructing said sequence of frames from said milestone frames and motion vectors of fragments between adjacent frames by interpolating pixel values for each pixel and frames between said milestone frames based upon prototype pixels in said milestone frame, wherein said interpolated pixel has no prototype pixels in said initial milestone frame, $R_0$, so that said interpolated pixel value is determined by $$Rj\ (k,\ l) = (P-j)p_A/P + j\ p_P/P$$

where a final pixel value $p_P$ is taken from said milestone frame, $R_P$, and where $P_A$ is an average pixel value in a predetermined region surrounding said interpolated pixel value, whereby data compression of said sequence of frames is achieved by reducing pixel data from said sequence of frames into data compressed milestone frames and motion vectors of each fragment of each frame to the next adjacent frame in said sequence.

3. The method of claim 2 where no interpolated pixels in said predefined region exit, said method further comprises iteratively interpolating pixel value within said predefined region from already interpolated pixel values outside said predefined region until each pixel in said predefined region has an interpolated pixel value.

\* \* \* \* \*